US010295691B2

(12) United States Patent
Gorban et al.

(10) Patent No.: US 10,295,691 B2
(45) Date of Patent: May 21, 2019

(54) METHOD AND APPARATUS FOR PROCESSING LOG DATA

(71) Applicant: Reeves Wireline Technologies Limited, Leicestershire (GB)

(72) Inventors: Alexander Gorban, Leicester (GB); Evgeny Mirkes, Leicester (GB); Jeremy Levesley, Leicester (GB); James Whetton, Leicester (GB)

(73) Assignee: Reeves Wireline Technologies Limited, Leicestershire (GB)

( * ) Notice: Subject to any disclaimer, the term of this patent is extended or adjusted under 35 U.S.C. 154(b) by 50 days.

(21) Appl. No.: 15/291,693

(22) Filed: Oct. 12, 2016

(65) Prior Publication Data

US 2017/0108606 A1 Apr. 20, 2017

(30) Foreign Application Priority Data

Oct. 15, 2015 (GB) .................................. 1518236.3

(51) Int. Cl.
*G01V 1/00* (2006.01)
*G01V 1/48* (2006.01)
*E21B 47/12* (2012.01)

(52) U.S. Cl.
CPC ................ *G01V 1/48* (2013.01); *E21B 47/12* (2013.01); *G01V 2210/48* (2013.01);
(Continued)

(58) Field of Classification Search
CPC .................................. G01V 1/48; G01V 1/34
See application file for complete search history.

(56) References Cited

U.S. PATENT DOCUMENTS

| 4,847,814 | A | | 7/1989 | Angehrn |
| 5,859,811 | A | * | 1/1999 | Miller ...................... G01V 1/48 |
| | | | | 367/25 |

(Continued)

FOREIGN PATENT DOCUMENTS

| EP | 1279049 A1 | 1/2003 |
| WO | 2009029133 A1 | 3/2009 |

(Continued)

OTHER PUBLICATIONS

Combined Search and Examination Report in counterpart UK Appl. GB 1518236.3, dated Apr. 15, 2016, 5-pgs.

*Primary Examiner* — Krystine E Breier
(74) *Attorney, Agent, or Firm* — Blank Rome LLP

(57) ABSTRACT

To process geological log data, a two-dimensional set of log values recorded at a plurality of points is obtained about a borehole periphery, and over a chosen length along the borehole. The set of log values are decomposed by identifying in the set one or more main functions indicative of one or more main geological layer features of the rock penetrated by the borehole and removing log values corresponding to values of the main functions from the set of log values. Further decomposing the set of log values can be performed, as necessary iteratively, based on one or more subsidiary functions. The log values of the set remaining after identification and removal of values are designated as texture. Functions indicative of the main and subsidiary layer features and the texture are used to construct a synthesized volume representing the rock removed during creation of the chosen length of the borehole.

19 Claims, 7 Drawing Sheets

(52) U.S. Cl.
CPC ............... *G01V 2210/614* (2013.01); *G01V 2210/6169* (2013.01); *G01V 2210/62* (2013.01)

(56) References Cited

U.S. PATENT DOCUMENTS

| | | | |
|---|---|---|---|
| 8,848,484 B2* | 9/2014 | Valero | G01V 1/48 367/26 |
| 2009/0259446 A1 | 10/2009 | Zhang et al. | |
| 2013/0170713 A1 | 7/2013 | Kumar et al. | |
| 2017/0032532 A1* | 2/2017 | Andersen | E21B 49/02 |
| 2018/0031720 A1* | 2/2018 | Etiene Queiroz | G01V 1/48 |

FOREIGN PATENT DOCUMENTS

| | | | |
|---|---|---|---|
| WO | 2009126881 A2 | 10/2009 | |
| WO | 2015150883 A1 | 10/2015 | |

* cited by examiner

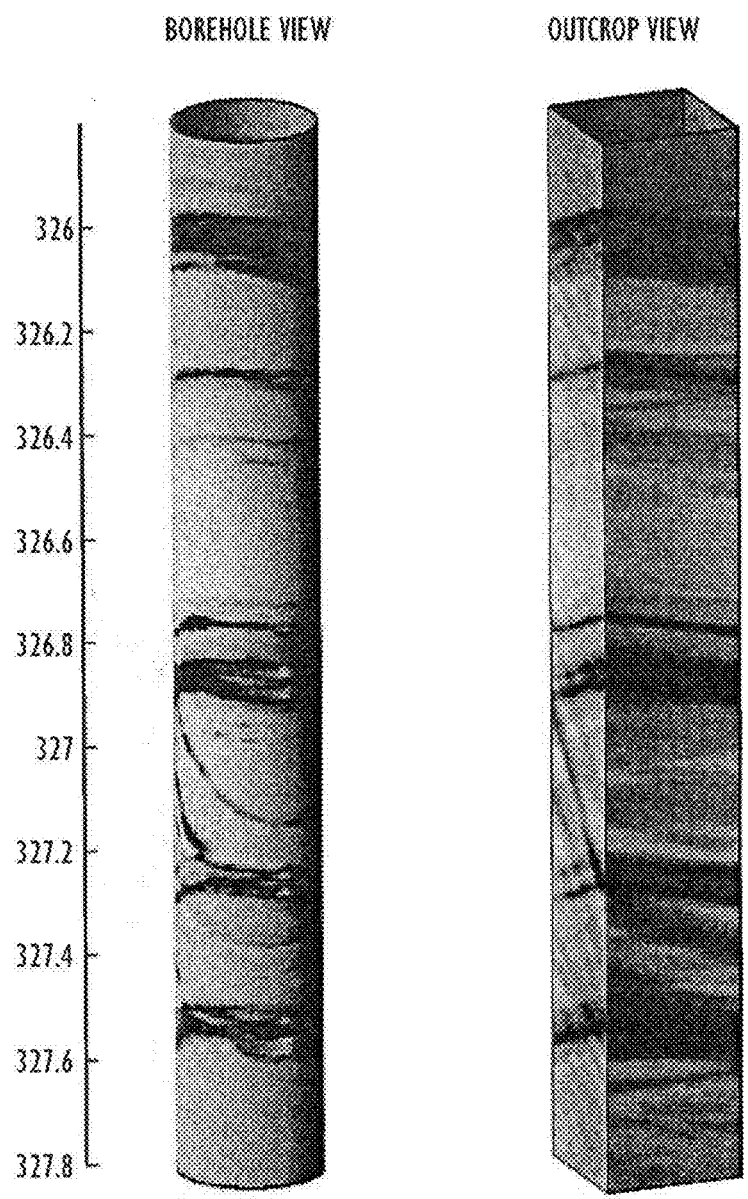
*Figure 5*    *Figure 6*

METHOD AND APPARATUS FOR PROCESSING LOG DATA

FIELD OF THE DISCLOSURE

The subject matter of the present disclosure relates to a method of and apparatus for processing log data, especially image log data. The disclosed subject matter also relates to images, logs, and data produced in accordance with the methods and using the apparatuses defined herein.

BACKGROUND OF THE DISCLOSURE

As is well known, prospecting for minerals of commercial or other value (including but not limited to hydrocarbons in liquid or gaseous form; water e.g. in aquifers; and various solids used e.g. as fuels, ores or in manufacturing) is economically an extremely important activity. For various reasons those wishing to extract such minerals from below the surface of the ground or the floor of an ocean need to acquire as much information as possible about both the potential commercial worth of the minerals in a geological formation and also any difficulties that may arise in the extraction of the minerals to surface locations at which they may be used.

For this reason over many decades techniques of logging of subterranean formations have developed for the purpose of establishing, with as much accuracy as possible, information as outlined above both before mineral extraction activities commence and also, increasingly frequently, while they are taking place.

Broadly stated, one form of logging involves inserting a logging tool (also sometimes called a "sonde") into a borehole or other feature penetrating a formation under investigation; and in most sonde designs using the sonde to energise the material of the rock, etc., surrounding the borehole in some way. The sonde or another tool associated with it that is capable of detecting energy is intended then to receive emitted energy that has passed through the various components in the rock before being recorded by the logging tool.

In another form of logging, known as logging-while-drilling (LWD), energising and detecting elements are supported in a collar either as a recognisable sonde or by reason of being supported in some other way such as a distributed arrangement.

Notwithstanding the constructional differences of LWD logging equipment compared with more conventional logging sondes, in the LWD equipment a process of energising rock surrounding a borehole and detecting returned energy is also practised.

The passage of the energy through the rock alters its character. Knowledge of the attributes of the emitted energy and that detected after passage through the rock may reveal considerable information about the chemistry, concentration, quantity and a host of other characteristics of minerals and associated fluids in the vicinity of the borehole, as well as geological aspects that influence the ease with which the target mineral material may be extracted to a surface location.

Logging techniques are employed throughout the mining industries, and also in particular in the oil and gas industries. In the logging of oil, coal and gas fields (including fields combined with rock types such as shales) specific problems can arise. Broadly stated, this is because it is helpful to consider a geological formation that typically is porous and that contains a hydrocarbon-containing fluid such as oil or gas or (commonly) a mixture of fluids perhaps only one component of which is of commercial value.

This leads to various complications associated with determining geological attributes of the oil or gas field in question. In consequence a wide variety of logging methods has been developed over the years. The logging techniques exploit physical and chemical properties of a formation usually through the use of a logging tool or sonde that as outlined above is lowered into a borehole (that typically is, but need not be, a wellbore) formed in the formation by drilling; or a collar also as outlined above.

Typically, as noted, the tool sends energy into the formation and detects the energy returned to it that has been altered in some way by the formation. The nature of any such alteration can be processed into electrical signals that are then used to generate logs (i.e. graphical or tabular representations containing much data about the formation in question).

The borehole usually is several hundreds or thousands of feet in length yet is narrow (being perhaps as narrow as 3 inches (about 76 mm) or less in diameter), although in practice such a borehole is almost never of uniform diameter along its length. A borehole normally is formed by drilling using a drill bit fed into the borehole on drillpipe, although other techniques occasionally are used.

One general class of logging is intended to produce so-called image logs, which are graphical representations of the rock in the vicinity of a borehole. Image logs are not optical images, and instead are generated by sending typically an electrical current, an acoustic signal or nuclear radiation from a sonde or other emitter into the rock; and processing the returned energy as electrical or electronic signals in a way that produces coloured plots in which different regions represent different geological features.

Of particular interest to geologists who study image logs is the identification of layer-like features. These can represent fractures, beds, the edges of beds and similar phenomena that either may help to indicate the likely presence of materials of value; or may indicate potential problems in the extraction of such materials.

The creation of an image log involves the operation of a sonde or other emitter, as indicated, while it is being withdrawn along a borehole towards a surface location or (in some cases) conveyed from a surface location into the borehole; or while the borehole is being drilled. The sonde energises the rock in an azimuthal pattern as it moves, with the result that the rock surrounding the borehole is logged at spaced intervals along a chosen length of the borehole and at points around the circumference of the generally circular cross-section of the borehole.

This results in a two-dimensional set of log data values that are processable as electrical or electronic signals. The co-ordinates of the individual values can be presented as borehole depth (i.e. distance along the borehole) and azimuthal (i.e. angular distance around the borehole) co-ordinates. Such a co-ordinate system is referred to herein as a cylindrical co-ordinate system, and references to a cylindrical frame of reference may be construed accordingly. In this regard the concept of the "frame of reference" of a co-ordinate system is extremely familiar to geologists and geoscientists, and is made use of routinely by such workers.

When the signals representative of the data are processed to produce a coloured image as mentioned above this too necessarily is two-dimensional, and resembles a hollow cylinder that has been cut lengthwise and "unrolled" to present a flat image.

An edge, bed or layer feature that intersects the borehole at anything other than a right angle appears as a sinusoid or, more typically, (as a result of inconsistencies in the borehole and in the logging process) a distorted, partially occluded or otherwise incomplete sinusoid the line thickness of which may not be constant in such a flat image plane. Such imperfect sinusoids are hard to interpret correctly and yet are commonplace. A human viewer assessing the two-dimensional image must seek to envisage the layer feature in the three-dimensional space that gave rise to the sinusoid in the two-dimensional rendition. This is difficult to achieve reliably or in a reasonable timescale.

Most machine viewers are also likely to be inefficient at identifying the sinusoids.

This is partly because there may be many edge, bed, or layer features, caused by differing phenomena, in the length of borehole logged. This results in a confusing superimposition of one sinusoid on another in the two-dimensional image log. Neither machine viewers nor humans are very good at discriminating between different features in such conditions.

Some of the sinusoids are geologically more significant than others, yet hitherto machine-based viewing methods have been poor at discriminating between important and insignificant features.

In addition to the foregoing the existing image logging techniques produce an image of the rock at the interface defining the outer extremity of the borehole. Prior art image logging methods are not capable of interpolating to produce data on the approximately cylindrical region of rock that is removed during the process of drilling or otherwise forming the borehole. Moreover the prior art has not provided any good way of synthesizing images of cores, i.e. discrete cylindrical or essentially cylindrical sections of rock used e.g. for assessing various qualities of the rock in which a borehole is to be drilled or has been drilled.

More generally it is desired to produce image logs that more realistically represent the three-dimensional reality "down hole" in a borehole than the existing two-dimensional renditions that are currently available.

What is needed is a way to overcome or at least ameliorate one or more drawbacks of the prior art.

SUMMARY OF THE DISCLOSURE

In a first, broad aspect of the present disclosure there is provided a method of processing geological log data signals comprising the steps of transforming electrical signals representative of a geological log image in cylindrical co-ordinates of a borehole or fullbore rock core into a Cartesian Earth co-ordinates image.

In one sense therefore the method of the present disclosure in its broad aspect may be understood as transforming via a non-linear projection signals representing an image acquired in a borehole or cylindrical co-ordinate system into an image rendered in the frame of reference of the Earth, i.e. a Cartesian Earth co-ordinates system.

Preferably the method of the present disclosure includes visualizing the transformed image in a manner reflecting grain size. An advantage of the method of the present disclosure in its broadly stated form is that when the image log data are presented in outcrop view (being a form of image log with which geologists and geoscientists are familiar) the angular relationships between geological features are the same as those observed in the earth.

This avoids the presentation of geological information in the flattened cylinder form mentioned above. In turn this means that geologists may with confidence apply the interpretational rules developed for physical outcrops to image log data, thereby improving the interpretation process.

According to the present disclosure in a further aspect, that optionally may be practised as part of a method as set out above or independently of such a method, there is provided a method of processing geological log data comprising the steps of:

a. obtaining a two-dimensional set of log values recorded at a plurality of points i) about the periphery of a borehole, and ii) over a chosen length along the borehole;

b. decomposing the set of log values by identifying in the set one or more main functions indicative of one or more main geological layer features of the rock penetrated by the borehole and removing log values corresponding to values of the main functions from the set of log values;

c. further decomposing the set of log values by, as necessary iteratively, identifying in the set one or more subsidiary functions indicative of one or more 1st . . . nth subsidiary geological layer features of the borehole and removing log values corresponding to values of the 1st . . . nth subsidiary functions from the for the time being remaining set of log values;

d. designating the log values of the set remaining after identification and removal of values of a function indicative of one or more nth subsidiary geological layer features of the borehole as texture;

e. using functions indicative of the main and 1st-nth subsidiary layer features and the texture to construct a synthesised volume representing the rock removed during creation of the chosen length of the borehole; and f. storing, printing, transmitting, processing, analysing, displaying and/or viewing the synthesised volume.

The method of the present disclosure provides numerous advantages. Primary among these is that it permits in a highly successful way the generation of three-dimensional image logs (and images) that re-create the features of rock removed during the formation of the borehole, including their geometrical relationships as they would be observed in outcrop.

Such image logs may be displayed as realistic three-dimensional images or (using two-dimensional computer screens) simulations thereof, thereby significantly improving the presentation of edge, bed and layer features.

The method allows flexibility as to the number of subsidiary functions that are identified. Thus the user may assess the extent to which the method identifies subsidiary features and based on this may adjust the sensitivity of the method. Furthermore it is possible to automate a process of sensitivity adjustment e.g. according to whether useful information is obtained from higher-number iterations of the method.

As used herein the term "layer" or "layer feature" may refer to layers, edges, bed, parts thereof, or similar features.

The method of the present disclosure additionally permits the synthesising of cores. In other words the present disclosure permits the generation of three-dimensional models, and two-dimensional and three-dimensional images derived therefrom, based on image or other data describing the surfaces of rock cores. Such data may be obtained e.g. from core samples. The present disclosure permits the modelling of the interior structures of rock cores based on rock core surface data. Thus in the broad aspect of the present disclosure defined herein references to "rock removed during creation of the chosen length of the borehole" could be a reference to rock removed during the creation of a conventional borehole or it could equally be a reference to rock removed in order to acquire a core sample. The terms "log values" and related expressions are, in the context of the synthesis of the interiors of core samples, to be construed as references to core sample surface image data values as opposed to more conventional log data acquired through operation of a logging tool inside a borehole.

When the method of the present disclosure is used for the purpose of processing image log data acquired through operation of a logging tool in a borehole, preferably the set of log values includes one or more of resistivity image log values, acoustic image log values or density image log values. Additionally or alternatively the set of log values may include a plurality of azimuthal measurements of dielectric constant. The method of the present disclosure is applicable to other types of log or other measurement that can be used to generate image logs or other image forms. A non-limiting example is the core surface (image) data referred to above, which as mentioned in accordance with the method of the present disclosure may be processed in order to synthesise images and/or other data pertaining to the content of a core sample over and above what is visible or measurable on its surface.

Conveniently the method includes the step of g. identifying a plurality of slices spaced vertically apart by spacings corresponding to spacings between the plurality of depths in the chosen length of the borehole or one or more multiples thereof and each being characterised by the same values of $\phi$ and $\psi$ as defined herein; and h. designating the slices identified in Step g. as members of the same slice family.

This aspect of the method represents a useful way of identifying, in the log data set, functions indicative of geological layer and similar features.

In the preferred embodiments of the present disclosure described herein the slices are shown as planar discs, the members of a slice family all being orientated at the same angle relative to a chosen datum. However it is envisaged that in other embodiments of the present disclosure the slices may be non-planar, and/or non-circular, and/or of more complex form than the circular discs described. The term "slice" as used herein therefore is to be construed accordingly.

Preferably the method includes the step of i. allocating a slice number to each of the slices of a slice family. In other words the method optionally includes calculating the number of slices in a slice family that pertain to a particular layer, or similar, geological feature.

In a specific embodiment of the present disclosure the two-dimensional set of log values is $f_{ij}$, in which i represents 1, . . . , H rows and j represents 1, . . . , N columns, with each row corresponding to a depth measured along the length of the borehole and each column corresponding to an azimuthal angle $\alpha_j$ from a datum defined with respect to the circumference of the borehole; wherein each slice is parametrised by an angle $\phi$ between (i) the z-axis of an x, y, z co-ordinate system and (ii) a vector that is normal to the members of a slice family; and by an angle $\psi$ between (iii) the datum and (iv) a projection of a vector that is normal to a plane parallel to the base of a cylinder corresponding to the chosen length of the borehole; and wherein a directed length of projection of a vector $\vec{Of_{ij}}$ from the centre of the top of the cylinder is $p_{ij}$ and wherein the slice number is given by the expression $$v_{ij} = \text{round}\left(\frac{p_{ij}}{h}\right) = \text{round}\left(\frac{R}{h}\sin\phi\,\cos(\psi - \alpha_j) + (i-1)\cos\phi\right)$$

In the foregoing $P_{ij} = \vec{n}.Of_{ij}$ and R is the radial distance shown in FIG. 2 hereof (the context of FIG. 2 being described further hereinbelow).

Such steps can be carried out on the electrical log signals using a programmable device as described in more detail herein.

Further preferably $m_{ij}$ is a mask having a value of 1 if a particular $f_{ij}$ is known and a value of 0 if a particular $f_{ij}$ is unknown, the method including calculating $m_k = \Sigma_{v_{ij}=k} m_{ij}$; $f_k = \Sigma_{v_{ij}=k} f_{ij}$ and a mean $$\overline{f_k} = \frac{f_k}{m_k};$$

substituting $\overline{f_k}$ for $f_{ij}$ for all points in the set of log values for which $v_{ij}=k$; and subtracting $\overline{f_k}$ from the set of log values in order to remove the geological log data corresponding to the main function, such that at least one subsidiary function subsists in the resulting remaining geological log data set. This aspect of the method of the present disclosure is beneficially efficient in terms of iteratively identifying the main and 1st . . . nth subsidiary functions as forming part of the inventive method.

In preferred embodiments the method of the present disclosure includes the steps of iteratively calculating $\overline{f_k}$ in respect of the geological log data corresponding to 1st . . . nth subsidiary functions and in each iteration subtracting $\overline{f_k}$ from the set of log values.

Conveniently each main function is represented in the set of image log values by values of $\phi$ and $\psi$, and the Step b. includes identifying in the set one or more main functions indicative of one or more main geological layer features of the borehole by the step of j. determining the maximal variance of $\phi$ and $\psi$.

Identifying the main functions in this manner further is efficient and reliable.

When the method includes the Step g. indicated herein preferably the Step j. of determining the maximal variance of $\phi$ and $\psi$ includes the Step k. of, in respect of a said slice family, identifying a slice corresponding to a main geological layer feature and for which the variance of the values of $\phi$ and $\psi$ of the set of resistivity log values of the slice family excluding the $\phi$ and $\psi$ values of the slice corresponding to a main geological layer feature is minimal.

The Step k. preferably includes searching for a maximal value of the expression $$\text{fit}(\phi, \psi) = \sum_{v(\phi,\psi)} m_{v(\phi,\psi)} \overline{f_{v(\phi,\psi)}}^2$$

as an indicator of a slice corresponding to a main geological layer feature. Such steps also can be carried out by a programmable device as described in more detail herein.

Preferably the Step c. of further decomposing the set of log values by, as necessary iteratively, identifying in the set one or more subsidiary functions indicative of one or more 1st . . . nth subsidiary geological layer features of the borehole and removing log values corresponding to values of the 1st . . . nth subsidiary functions from the for the time being remaining set of log values includes representing in the for the time being remaining set of log values each 1st . . . nth subsidiary geological layer feature by subsidiary values of $\phi$ and $\psi$ data; and identifying in the set one or more subsidiary functions indicative of one or more subsidiary geological layer features of the borehole by the step of l. determining the maximal variance of the subsidiary $\phi$ and $\psi$ data.

The identification of slice families is an optional feature of this aspect of the method of the present disclosure. To this end therefore the method includes identifying a plurality of slices spaced vertically apart by spacings corresponding to spacings between the plurality of depths in the chosen length of the borehole or one or more multiples thereof and each being characterised by the same $\phi$ and $\psi$ and designating the said slice families as relating to one or more subsidiary layer features.

Conveniently the Step l. of determining the maximal variance of the subsidiary $\phi$ and $\psi$ data includes the Step m. of identifying a said subsidiary function for which the variance of the values of the $\phi$ and $\psi$ data of the geological log data set for the time being remaining are minimal.

In more detail, preferably the Step d. of designating the log values of the set remaining after identification and removal of values of a function indicative of one or more subsidiary geological layer features of the borehole as texture includes the sub-steps of:

d1. in the field of remaining log values $r_{ij}$, calculating correlation radii $r_h$ and $r_z$;
d2. calculating layer parameters $\phi_t$ and $\psi_t$ for the field $r_{ij}^2$;
d3. calculating the variance $\sigma(z)$ for each slice;
d4. generating a 3D random field T(x, y, z) such that $$T'(x, y, z) = \begin{cases} 0 & \text{if } x^2 + y^2 \geq 1 \\ rnd\left(0, \sigma(z')\sqrt{r_h^2 r_z}\right) & \text{if } x^2 + y^2 < 1 \end{cases},$$

where rnd is the randomly generated normally distributed value, z' is defined as number of slice which contains the point (x, y, z); and d5. smoothing the field T(x, y, z) by substitution of $$\frac{1}{r_h^2 r_z} \sum_{x'=-r_h}^{r_h} \sum_{y'=-r_h}^{r_h} \sum_{z'=-r_z}^{r_z} T'(x', y', z')$$

Such steps also conveniently can be carried out using a programmable device as described in more detail herein.

In preferred embodiments of the present disclosure the Step e. of using the functions indicative of the main and 1st . . . nth subsidiary layer features and the texture to construct a synthesised volume representing the rock removed during creation of the chosen length of the borehole includes summing the main function, the 1st . . . nth subsidiary function and the texture in respect of the volume representing the rock removed during creation of the chosen length of the borehole. This has been found to be an advantageously efficient and accurate technique for creating an image of the material removed during formation of the borehole. This aspect thus achieves one of the major aims of the present disclosure.

Further preferably the method of the present disclosure includes the step of modulating the synthesised volume with a variable measure of a geological property of the rock from place to place in the synthesised volume; and storing, printing, transmitting, processing, analysing, displaying and/or viewing the resulting modulated, synthesised volume. Such modulation can produce 3D images or simulated 3D images that in addition to showing geological layer and other features with high accuracy also include keyed or otherwise recognizable information indicating properties of the rock under investigation.

Such properties may be grain size or a proxy for grain size. The proxy may be selected from the list consisting of e.g. resistivity, porosity, hardness, density, borehole diameter, statistical measures relating to the distribution of values from one or more such properties in an interval, or combinations of one or more such quanta.

In addition to the foregoing, the subject matter of the present disclosure is considered to reside in a programmable device that is programmed to carry out a method in accordance with the present disclosure as defined hereinabove.

The subject matter of the present disclosure is also considered to reside in a logging tool that includes or is operatively connected to a programmable device as aforesaid.

In yet a further aspect the subject matter of the present disclosure resides in a method as defined hereinabove including the steps of causing a logging tool to move in a borehole while acquiring geological log data.

The extent of the disclosed subject matter also reaches to log or core data or a log or core image produced by a method as defined hereinabove; log or core data or a log or core image produced using a programmable device in accordance with the present disclosure; or log or core data produced using a logging tool in accordance with the present disclosure. For the avoidance of doubt, the terms "log data" and "log image" may include e.g. (i) data or images derived from the surface log data of boreholes and used in accordance with the method of the present disclosure to derive images of rock removed during the borehole forming process; and/or (ii) data or images derived from the surfaces of core samples, and from which the method of the present disclosure synthesizes data on or images of the interior structures of the core samples.

The subject matter of the present disclosure is of benefit in logging activities potentially in all kinds of mining and especially in the logging of reserves of oil and gas. The disclosed subject matter is applicable in a variety of image logging situations, including but not limited to occasions when image logs are created using resistivity, acoustic or nuclear logging tools. The disclosed subject matter relates especially to the processing of electrical or electronic signals as aforesaid to transform them to create more useful image logs than has hitherto been possible.

All the information available for reconstruction is located on the borehole wall or core surface. The interior is not sampled. The disclosed subject matter therefore differs from another 3D in-painting problem in which the interior of an object is partially sampled. Aspect ratio is another differentiating characteristic of the present disclosure, wherein the borehole images obtained by the methods of the present disclosure are long relative to their diameter. For the data sets obtained by the present disclosure, the depth sample increment in an exemplary, non-limiting case may be 0.002 m and the data set may comprise 176 circumferential samples.

DESCRIPTION OF THE DRAWINGS

FIG. 5 is a three-dimensional image log of the region of rock penetrated by a borehole, the image log being constructed through practising of the method of the present disclosure;

FIG. 6 is a so-called "outcrop view" image log created from the image log of FIG. 5;

DETAILED DESCRIPTION

There now follows a description of preferred embodiments of the present disclosure, by way of non-limiting example.

Figure 1:
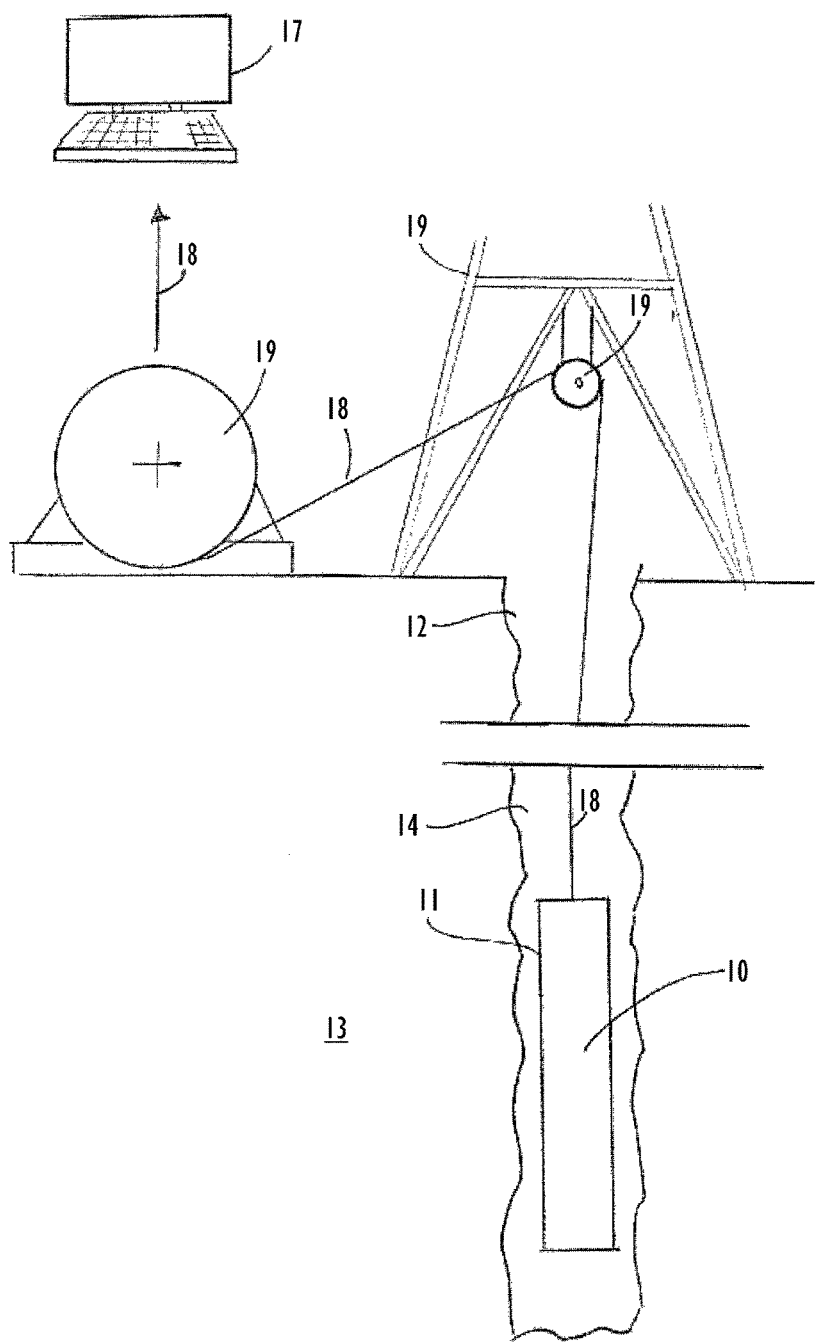
FIG. 1 is a schematic representation of a logging operation via which image log data may be acquired.

Referring to FIG. 1 of the drawings there is shown a borehole 12 formed in e.g. a hydrocarbon-bearing rock 13 by drilling. In FIG. 1 an imaging logging tool 10 according to the present disclosure is deployed in the borehole 12 and operatively connected, or at least is connectable, to communicate with a programmable device that in the embodiment shown takes the form of a personal computer 17 (although other forms of programmable device are possible within the scope of the present disclosure). FIG. 1 shows the logging tool 10 connected to the computer 17 by wireline 18 that is paid out into the borehole 12 by way of per se known paying out and rewinding equipment 19.

The logging tool 10 may be e.g. a resistivity image logging tool, the essential characteristics of which are known to the person of skill in the art; an acoustic logging tool, with which the skilled person is also familiar; or a nuclear logging tool that is also known per se in the logging tool art. The method of the present disclosure is also believed to be viable in respect of a logging tool that generates a series of azimuthal measurements of dielectric constant.

As is also known to the person of skill in the art numerous variations on the illustrated simple logging tool connection arrangement are possible. FIG. 1 represents one exemplary and non-limiting way in which the logging tool 10 may communicate with a programmable device located at a surface location.

It is not essential that wireline is the chosen method of connection; or that the programmable device is located externally of the borehole 12 as shown. On the contrary it is possible for instance for the programmable device to be located partly or entirely in a downhole location, for example forming part of a logging or drill string. All such variants are within the scope of the present disclosure. The programmable device does not have to be in the personal computer configuration shown; and may exist as multiple devices or as a device having multiple parts. Moreover various wireless communication methods are possible for causing communication between the logging tool 10 and a remotely located programmable device 17 when it is not possible or desired to use wireline or a similar connecting cable.

Thus the logging tool and the programmable device(s) may be connected e.g. using a wired connection, or wirelessly; or in some circumstances there is no direct connection. In the latter case the log data can be conveyed by any of a range of means, such as but not limited to radio frequency transmission or a portable memory device, to the programmable device(s).

The borehole 12 may not be vertical (and indeed may extend e.g. inclinedly or horizontally); it is unlikely to be completely straight; and so-called "squeezing" of the borehole walls or other forms of collapse may lead it not to be parallel-sided. In consequence the rugose borehole shown in FIG. 1 while stylised may therefore be a reasonably realistic representation. The present disclosure is applicable in respect of all boreholes in which a logging tool is useable, including non-idealized boreholes such as those described above or shown in FIG. 1.

The borehole 12 in the example shown is filled with borehole fluid 14 which may be a drilling mud, a chemical introduced into the borehole in order to achieve certain effects as will be known to the person of skill in the art, water, brine, oil, one or more gases or (very commonly) mixtures, emulsions and/or solutions of two or more of the aforesaid components.

In use of the logging tool 10 the cylindrical body 11 is conveyed inside the borehole 12 e.g. supported on wireline or on drill pipe to a chosen location that can be identified by any of a range of techniques known to a logging tool operator. The logging tool is then withdrawn from the borehole while logging the surrounding rock in the manner outlined herein.

When wireline 18 is used to connect the logging tool 10 to the personal computer 17 or other programmable device the log data may be processed, in accordance with method steps defined herein, in real-time or near real-time.

In other embodiments of the present disclosure the data may be telemetered by another means such as coded mud pulse or electromagnetic pulse transmission as will be known to the person of skill in the art. In yet further embodiments of the present disclosure the logging tool 10 may be autonomous when operating in the borehole 12. Such a logging tool typically includes an on-board power source such as a battery pack; and a memory device that is used to store log data gathered while the logging tool is withdrawn along the borehole. The log data can be subsequently downloaded from the memory device for processing in a programmable device such as the computer 17 of FIG. 1.

In yet a further variant within the scope of the present disclosure an autonomous logging tool may include an integral or attached programmable device that processes the log data while the logging tool 10 is being withdrawn as aforesaid.

Regardless of the precise manner of operation of the logging tool 10 an intermediate result of logging activity is a two-dimensional array of log data relating to a chosen logged length along the borehole 12. The data may be considered as originating in an elongate cylinder 21 the radius of which corresponds to the borehole radius; and the length of which corresponds to the chosen logged depth of the borehole.

In the data array any given data point can be defined as $f_{ij}$ in which i represents one of 1, . . . , H enumerate rows and j represents one of 1, . . . , N enumerate columns. In the preferred embodiment of the present disclosure the rows of the data array correspond to depth, i.e. the chosen length of logged borehole; and the columns correspond to the angular rotation about the outer periphery of the elongate cylinder 21 from an angular datum point. In a vertically descending borehole the datum point preferably is True North. In a horizontal or near-horizontal borehole the datum point may be selected to be the highest point of the cross-section of the borehole. In inclined boreholes the datum point may be selected from True North and this highest point, at the option of the analyst. True North is often used because it is of assistance in the depiction of the images.

The preferred embodiment of the method of the present disclosure includes the steps of a. obtaining a two-dimensional set of log values recorded at a plurality of points i) about the periphery of a borehole, and ii) over a chosen length along the borehole;

b. decomposing the set of log values by identifying in the set one or more main functions indicative of one or more main geological layer features of the rock penetrated by the borehole and removing log values corresponding to values of the main functions from the set of log values;

c. further decomposing the set of log values by, as necessary iteratively, identifying in the set one or more subsidiary functions indicative of one or more 1st . . . nth subsidiary geological layer features of the borehole and removing log values corresponding to values of the 1st . . . nth subsidiary functions from the for the time being remaining set of log values;

d. designating the log values of the set remaining after identification and removal of values of a function indicative of one or more nth subsidiary geological layer features of the borehole as texture;

e. using functions indicative of the main and 1st-nth subsidiary layer features and the texture to construct a synthesised volume representing the rock removed during creation of the chosen length of the borehole; and f. storing, printing, transmitting, processing, analysing, displaying and/or viewing the synthesised volume.

In general, the principal steps of the method of the present disclosure are:

1. Dividing the log into overlapping depth windows. Identifying the dominant set of planar/sub-planar geological features in each window and removing them from the image. This is known as Level 1 decomposition.

2. Identifying and subtracting the dominant planar feature set within the residual image. This is known as Level 2 decomposition.

3. Repeating the second step n times until all of the subsidiary planar geological features have been identified, such that the final residual image contains only non-planar features. These may include strongly non-planar features and a host of other features that are localised azimuthally and referred to herein as the "residual texture".

4. Identifying functions to represent the shape of the primary geological feature and each subsidiary feature for all levels of decomposition, and using these to construct a synthesised volume.

5. Propagating the residual texture through the volume.

Once created, the volume is visualized by, for example, making two longitudinal cuts through the oriented volume.

All the foregoing steps are completed by way of transformations of electrical signals in accordance with the method of the present disclosure into further signals that give rise to a log image display. The processes of the present disclosure are beyond the ability of a human operator to effect.

The data array for various reasons may include unknown values for $f_{ij}$. Such reasons may include characteristics of imaging tools such as tool 10 which lead to corrupted, occluded, or incomplete data points. It is possible to define a mask $m_{ij}$ that has a value of 1 if a given $f_{ij}$ is known and 0 if $f_{ij}$ is unknown.

Figure 2:
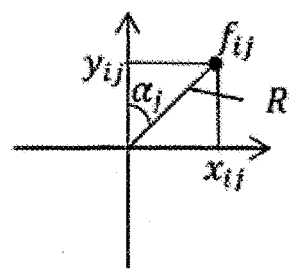
FIG. 2 shows co-ordinate system for defining locations in a logged length of borehole.

Assuming the nominal radius of the borehole is R and the spacing of the rows along the borehole is h, using a Cartesian co-ordinate system as described below and as illustrated in FIG. 2 it is possible to define the angle between the jth column and True North using the expression $$\alpha_j = \frac{2\pi j}{N}$$

in which the notation corresponds to the Cartesian co-ordinate system illustrated in FIG. 2. The origin O of the co-ordinate system is defined as the center of the top of the elongate cylinder 21. In FIG. 2 the y-axis is directed towards True North (or the uppermost point of the cross-section of the borehole in the case of the borehole extending horizontally or largely horizontally). The x- and y-co-ordinates of any given data point $f_{ij}$ in the data array are given by $$x_{ij}=R \sin \alpha_j, y_{ij}=R \cos \alpha_j.$$

The z-axis in FIG. 2 is directed downwardly, perpendicular to the plane of the page. The z-co-ordinate of the point $f_{ij}$ is given by the expression $$z_{ij}=h(i-1).$$

The Steps b. and c. of the method of the present disclosure may in a preferred embodiment of the present disclosure be put into effect by considering the cylinder 21 to be composed of a plurality of slices 22a, 22b, 22c . . . that are spaced from one another each by the same distance h along the chosen logged length of the borehole, and that are orientated to the transverse cross-section of the cylinder 21 by a certain angle. Such slices are visible in FIG. 3a.

Figure 3A:
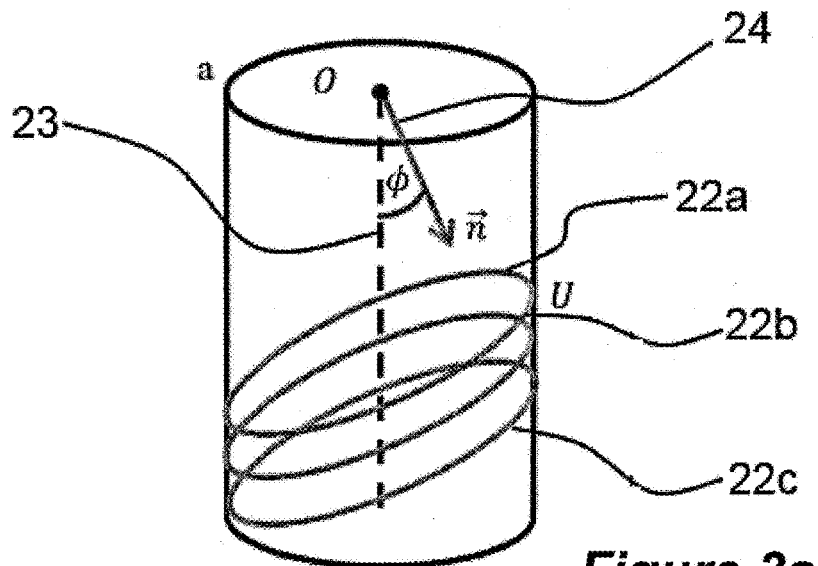
FIGS. 3a and 3b are schematic representations of the identification of "slices" in the volume corresponding to the aforesaid logged length of borehole.
Figure 3B:
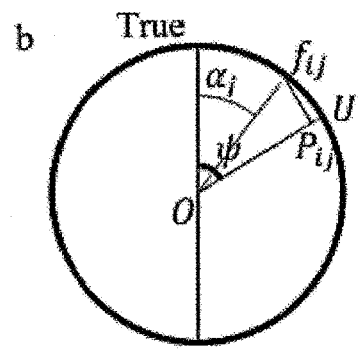

The slices 22a, 22b, 22c, . . . in a simple version of the present disclosure may be circular planes 22a, 22b, 22c, . . . as illustrated in FIG. 3a; but in alternative embodiments may be non-planar, irregularly positioned, spaced by distances that e.g. are integer or non-integer multiples of h and/or of more complex forms and shapes than the simple planes shown.

The slices 22a, 22b, 22c, . . . are in accordance with the method of the present disclosure considered as modelling the intersection of a layer or layer-like feature, such as but not limited to a bed, edge or a fracture, with the cylinder. The objective of the method of the present disclosure is to identify initially the slices forming one or more "families" the members of which model in the first instance the most prominent or readily identifiable such features of the cylinder 21. The number of slices 22a, 22b, 22c, in a given slice family may be greater or lesser than the three slices visible in FIG. 3a, the number of slices in this figure being merely exemplary.

Each slice is parametrized by two angles $\phi \in [0, \pi/2]$ and $\psi \in [0, 2\pi]$ and the distance from the centre of top base of cylinder 0. Initially a family of slices is defined to include all slices having the same angles $\phi$ and $\psi$. The algorithm of the present disclosure selects from these the slices corresponding to the features it is desired to isolate. The selection steps are described in more detail below.

Angle $\phi$ is the angle between the z-axis and the normal vector of a slice; and may also be considered as a measure of the apparent dip of a bed, edge or layer feature. Dip is an angular measure that is very familiar to geologists and others skilled in the art forming the background to the present disclosure.

Angle $\psi$ is the angle between True North (or such other datum as is applicable) and a projection of the normal vector of the slices of a slice family onto a plane parallel to the base of the notional cylinder 21.

Denoting all the slices in a potential slice family as $S_{\phi\psi}$ and assuming all the slices of the family are of the same constant thickness equal to the spacing h between adjacent members of the slice family in the longitudinal direction of cylinder 21 it is possible to enumerate the slices in the slice family by distance from the origin O of cylinder 21 along the vector 23 that extends normal to the end of the cylinder 21.

In order to calculate the number of a slice containing any given data point $f_{ij}$, it is helpful to consider a unit normal vector $\vec{n}$ indicated by numeral 24 in FIG. 2a. Using a Cartesian co-ordinate system the co-ordinates of the unit normal vector $\vec{n}$ are given by $$x_n = \sin\phi \sin\psi, \ y_n = \sin\phi \cos\psi, \ z_n = \cos\phi.$$

The co-ordinates of the point $f_{ij}$ are as given above. The directed length of projection of the vector $Of_{ij}$ on the normal vector is the dot product of the unit normal vector and the vector $Of_{ij}$:

$$p_{ij} = \vec{n} \cdot Of_{ij} = R \sin\phi \cos(\psi - \alpha_j) + h(i-1)\cos\phi$$

The enumeration of the slice may be given by $$v_{ij} = \text{round}\left(\frac{p_{ij}}{h}\right) = \text{round}\left(\frac{R}{h}\sin\phi\cos(\psi - \alpha_j) + (i-1)\cos\phi\right).$$

For each slice $v_k$ the method involves calculating the mean value of the mask $m_k$ using the expression $$m_k = \sum_{v_{ij}=k} m_{ij}.$$

and the mean value of the data using the expression $$f_k = \sum_{v_{ij}=k} f_{ij}.$$

From these one may calculate $\overline{f_k} = f_k/m_k$. This expression may then be used in a process of identifying one or more main functions (which correspond to one or more main geological features such as layers, beds or fractures likely to be of primary interest to an analyst) and subtracting or removing log values corresponding to values of the main function from the set of log values.

This is achieved by substituting $\overline{f_k}$ for $f_{ij}$ for all points at which $v_{ij}=k$. This selects the data points in the log data set corresponding to main geological features. These data points if desired may be processed to provide an image of each main geological feature. This however may be of limited value so the resulting main feature model function is in accordance with the method of the present disclosure then removed from the original data and one or more first subsidiary functions corresponding to the first level of subsidiary (i.e. less geologically significant) layer-like feature then calculated by an iteration of the foregoing method.

Each first subsidiary function then is subtracted from the remaining data, and the process repeated to isolate the second level of subsidiary function and so on. This process is then repeated as many times as required in order to achieve a requisite degree of detail in the model.

The inventors have found that the improvement in the level of detail becomes approximately asymptotic after ten iterations in the majority of cases. The method of the present disclosure however is not limited to the removal of main geological features and nine levels of subsidiary features. On the contrary, more or fewer iterations also lie within the scope of the present disclosure.

Thus, recursively there can be as many iterations until the statistics of the residual are more or less random or at a user-selected level.

To compute a value inside the volume, the appropriate slices that the point belongs to at each level of decomposition are identified. Then computation of the value of the residual texture inside the volume takes place by modelling of the residual texture as a three-dimensional moving average field. Autocorrelations of this field are evaluated by its boundary values and used for continuation of the field inside the volume. The model matches the empirical boundary values exactly and preserves the statistical properties of the residual texture inside the volume. The model can be improved by a multidimensional autoregressive moving average (ARMA) approach or other texture analysis algorithm.

It is at least desirable to assess whether the function identified and removed at each iteration as set out above is indeed the most significant in the sequence of possible functions remaining to be identified and removed from the log data. This is achieved through a quality of fit test that is performed on each slice family as it is identified using the process set out above.

The quality of fit test involves establishing whether the variance of log data values in a given slice family is maximal. If it is, then one may be confident that the slice family pertains to the most significant geological feature remaining to be identified in the log data, no matter how many (or how few) iterations of the foregoing method have been completed.

As noted the points in the log data array are designated with reference to the angles $\Phi$ and $\psi$ in the co-ordinate system of the cylinder 21. The technique for assessing the quality of fit of the selected function involves seeking the slice family characterized by the values of $\phi$ and $\psi$ such that variance of the remainder after removal as aforesaid is minimal.

Following removal of a set of log values corresponding to a main or subsidiary function (depending on where in the iteration cycle the process of the present disclosure has reached) the quality of fit test involves, firstly, calculating the variance of the remainder $r_{ij} = f_{ij} - \overline{f_{v_{ij}}}$. The variance is calculated using the expression $$\text{var}(r) = \text{var}(f_{ij} - \overline{f_{v_{ij}}}) = \frac{1}{M}\sum_{ij}\left((f_{ij} - \overline{f_{v_{ij}}}) - \overline{(f_{ij} - \overline{f_{v_{ij}}})}\right)^2.$$

In which M is the total number of known function values $M = \Sigma_{ij} m_{ij}$.

This expression may be rewritten after summing and substitution as $$\text{var}(r) = \frac{1}{M} \sum_{ij} f_{ij}^2 - \frac{1}{M} \sum_v m_v \overline{f_v}^2.$$

The fraction of explained variance is given by $$FVE(\phi, \psi) = \frac{\text{var}(f) - \text{var}(r)}{\text{var}(f)}.$$

The objective is to identify the maximum FVE ($\phi$, $\psi$) but this reduces to seeking the minimum var(r) since var(f) is constant. Thus the quality of fit assessment becomes one of searching for the maximal value of $$\text{fit}(\phi, \psi) = \sum_{v(\phi,\psi)} m_{v(\phi,\psi)} \overline{f_{v(\phi,\psi)}}^2.$$

This function therefore is used to seek the slice family in any given iteration of the method of the present disclosure having the maximal variance and hence being the highest significance slice family for the iteration in question.

Following removal of the requisite number of slice families corresponding to a commensurate number of iterations of the method the remaining data is designated as texture, as signified in Step d. of the method of the present disclosure as broadly defined herein.

The Step e. of the method of using the functions indicative of the Main and 1st, . . . , nth subsidiary layer features to construct a synthesized volume representing the rock removed during creation of the borehole involves summing the main function, the 1st, . . . , nth subsidiary functions and the texture in accordance with the expression $$\overline{f_{ij}} = \sum_{l=1}^{L} \overline{f_{v_{ij}^l}}.$$

In this expression L denotes the number of layers and the number of slices in each layer is $v_{ij}^l$. This equation is termed the "reconstruction algorithm" herein.

Operation of this algorithm produces a three-dimensional replica of the rock removed during construction of the borehole, with realistic continuation of features such as layer features of the kinds mentioned herein through the borehole volume.

Figure 4:
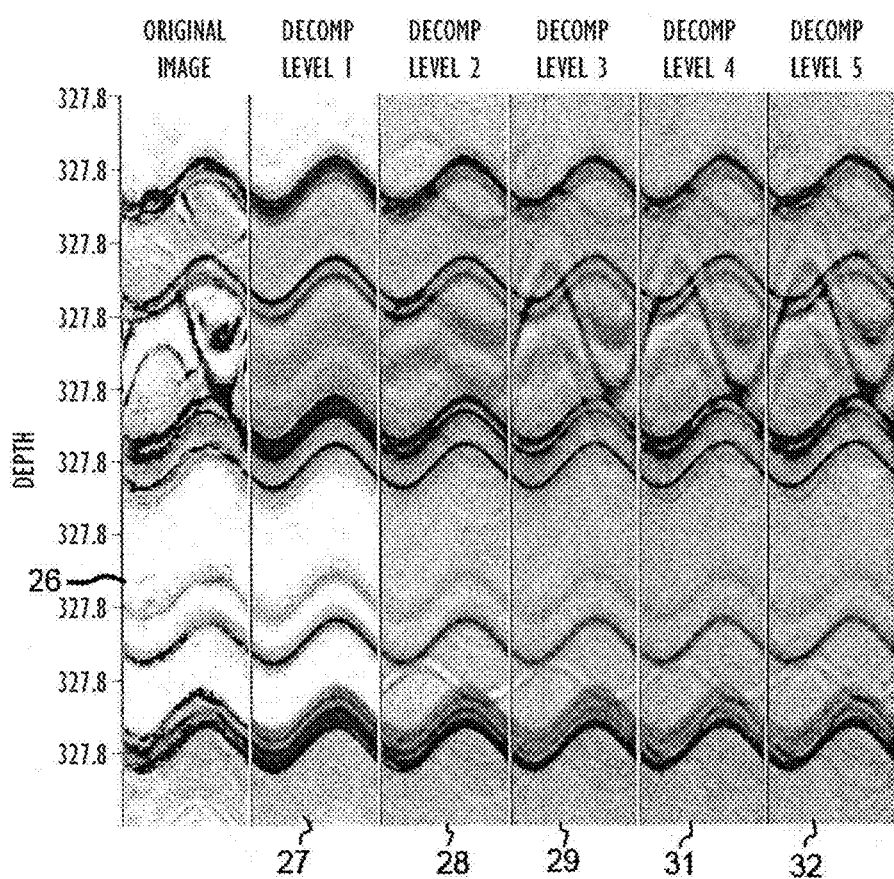
FIG. 4 is a sequence of two-dimensional image logs illustrating the effects of iteratively performing Steps b. and c. of the method of the present disclosure.

FIG. 4 illustrates the effect of the method of the present disclosure.

In FIG. 4 the left hand track (labelled "Original Image") shows an image 26 generated from the two-dimensional data array obtained through use of an imaging tool such as a resistivity logging tool, an acoustic logging tool or a nuclear logging tool. The image log data represent a cylindrical length of borehole that as described above owing to the two-dimensional rendition is as though it has been cut longitudinally and flattened to create the rectangular image plot shown.

The image is ambiguous owing to the overlaying and intersection of numerous geological features. These furthermore are hard to interpret owing to the two-dimensional rendition of a three-dimensional physical situation with the result that essentially planar features such as layers, edges, beds and similar phenomena that intersect the borehole other than orthogonally appear as sinusoids.

Such sinusoids are imperfect in various ways as described above.

For all the foregoing reasons the original image log 26 is hard for a human observer to interpret, and any human interpretation of this kind anyway is time-consuming to effect. Existing machine analysis methods may be entirely incapable of interpreting the log data correctly.

Image 27 to the right of image 26 (labelled "Decomposition Level 1") shows the result of a first iteration of the method of the present disclosure, which results in isolation of so-called main geological layer features such as bed boundaries. These show up as recognizable sinusoids that are in phase with one another.

Image 28 to the right of image 27 adds in the subsidiary geological layer features that can be identified following a second iteration of the method of the present disclosure, through a process as described of subtracting the most significant features from the remainder of the image log data after removal of the data corresponding to the features of image 27.

Images 29-32 show the results of further iterations with the result that increasingly subsidiary features become isolated. Image 32, which shows all the iterations in a single plot, resembles Image 26 but the features of each level of subsidiarity are separately categorized as a result of the method of the present disclosure. It thus would be straightforward to reproduce an image such as image 27 from image 32.

Through operation of the reconstruction algorithm it is possible to produce a replica of the rock removed during creation of the borehole. An example is shown in FIG. 5. FIG. 6 shows the reconstructed rock image in so-called "outcrop view" which is used by geologists to assist with analysis techniques. Methods for creating outcrop views with analysis techniques, and which mimic the use of a grain size indicator in stratigraphic columns, are methods of construction known to those of skill in the art.

As is evident from study of FIGS. 5 and 6 the geological features apparent at the boundary of the borehole as logged by the logging tool may in the reconstructed view be continued through the region of removed rock. This is of particular utility when analyzing some aspects of geology. The present disclosure thus may realistically simulate a core removed from a borehole, even though the actual rock constituting the core will have been comminuted during formation of the borehole. Thus the present disclosure is of potentially great use when logging is carried out at the same time as drilling operations.

As mentioned the method of the present disclosure involves the processing of signals in accordance with the method steps herein in order to give rise to entirely novel modes of presentation of log information e.g. using computer screens or in printed form. The method of the present disclosure moreover could readily give rise to log information presented by other means, as would be familiar to those of skill in the art of image presentation based on electrical signal manipulation.

Figure 7:
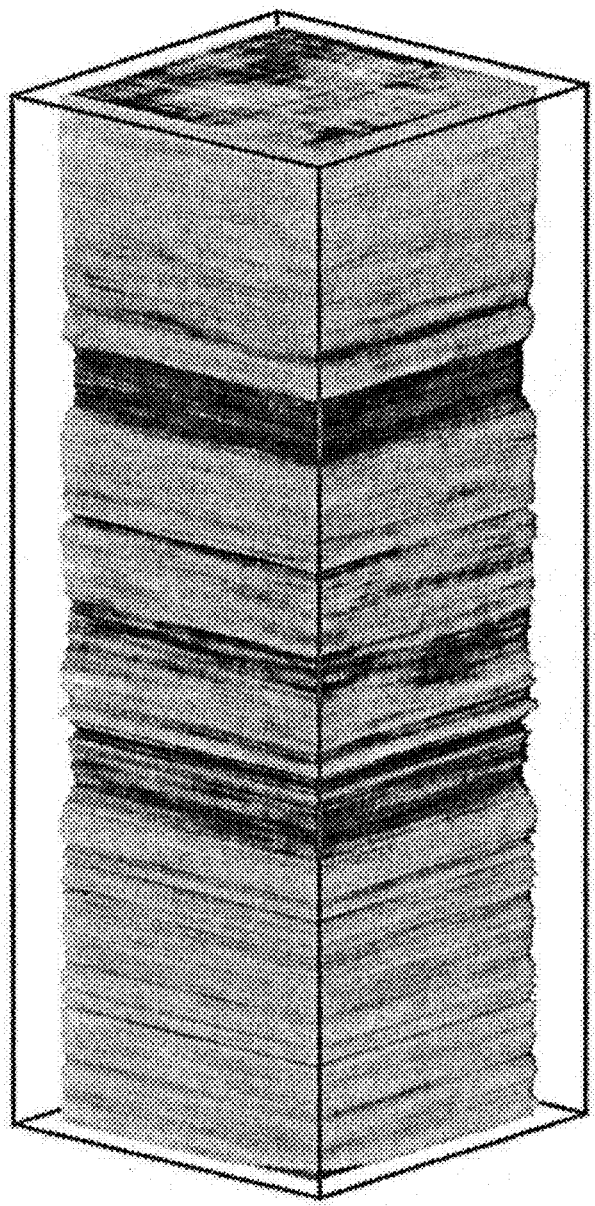
FIG. 7 is a view similar to FIG. 6 of an outcrop view created through practising of the method of the present disclosure, and in which the image log has been modulated with rock grain size information.

An outcrop view such as that of FIG. 6 may be modulated with characteristics of the rock that may be determined from measurements taken using other types of logging tool. FIG. 7 shows an outcrop view generated using the method of the present disclosure and that has been modulated with grain size data. Modulated views such as that of FIG. 6 and their methods of production as defined herein are within the scope of the present disclosure. Numerous parameters, as mentioned above, may be employed as part of the modulation process.

Figure 8:
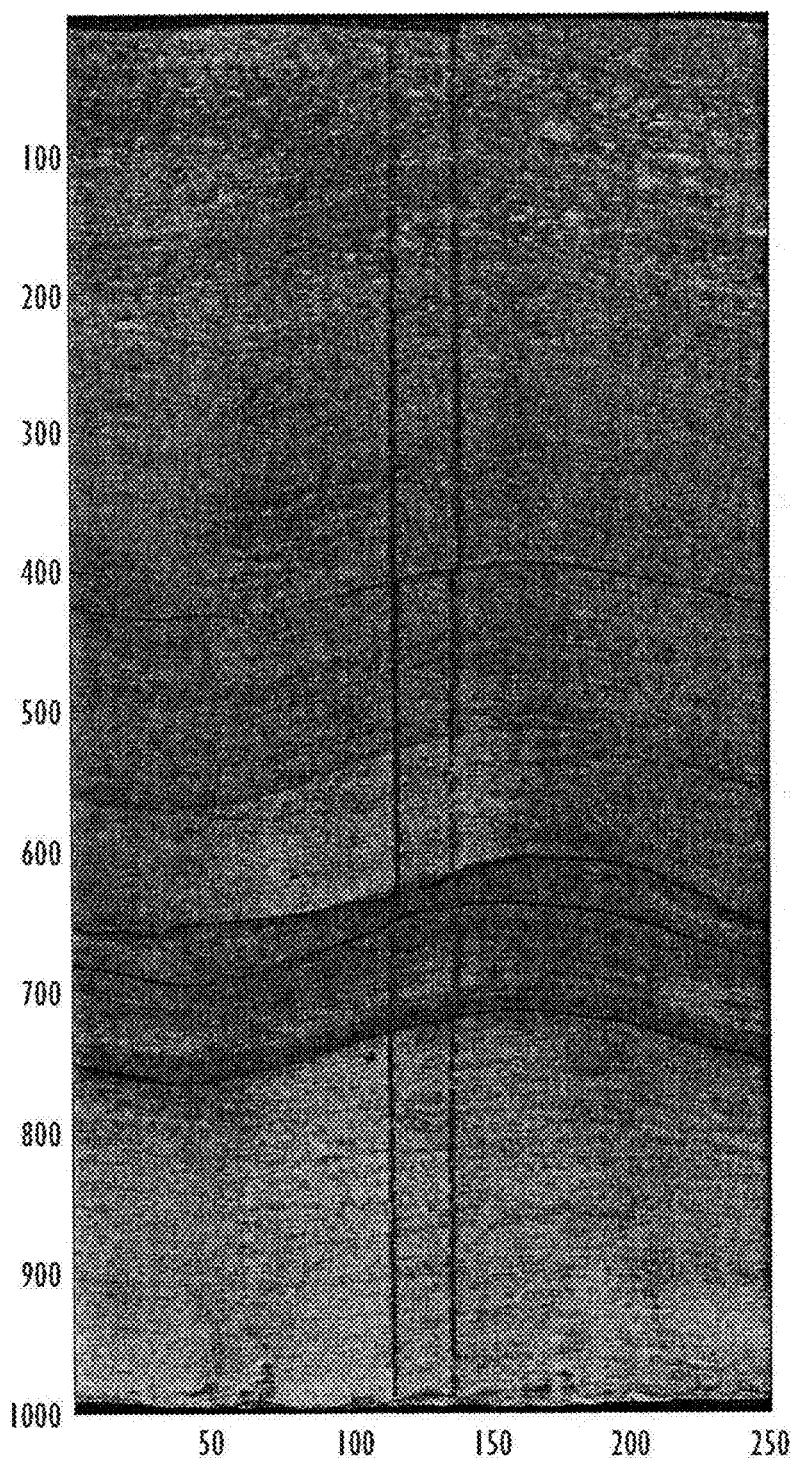
FIG. 8 is a conventional two-dimensional representation of surface image data acquired from a core sample.
Figure 9:
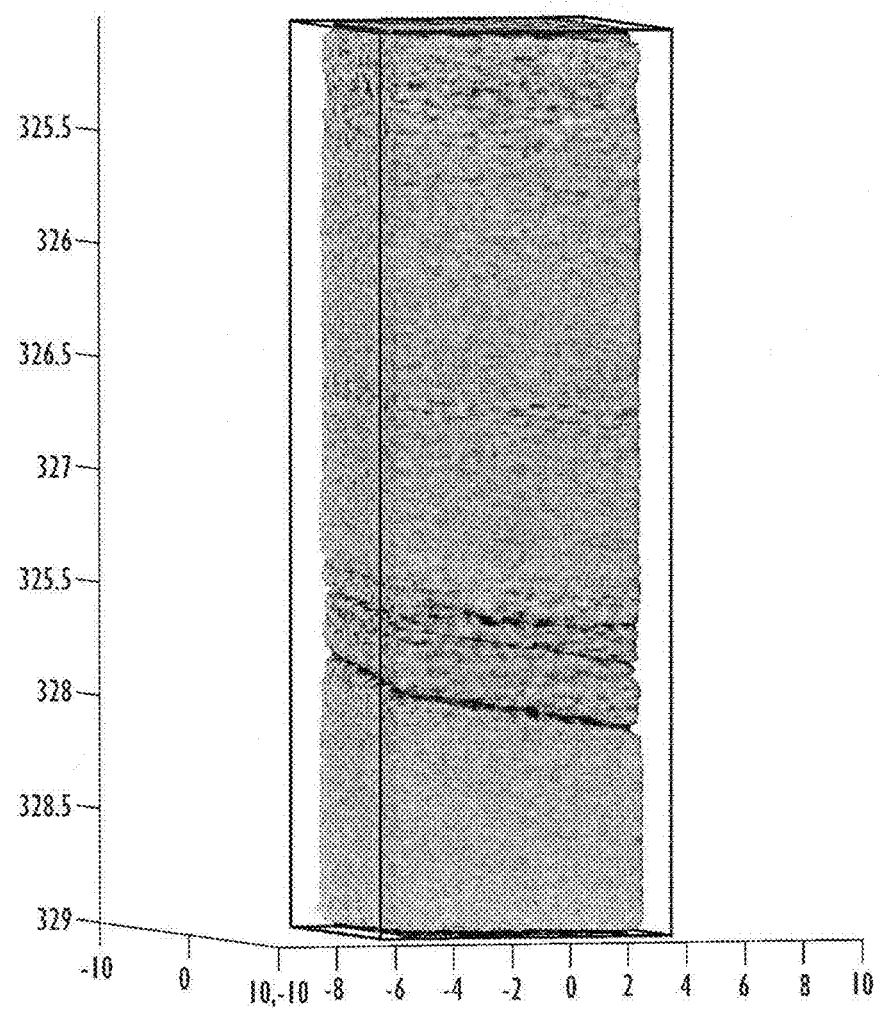
FIG. 9 is an outcrop view image showing the data of FIG. 8 following processing in accordance with the method of the present disclosure in order to synthesise the interior of the core sample based on the surface image data.

As mentioned above the method of the present disclosure also may be employed in relation to core samples, and an example of this is given in FIGS. 8 and 9.

FIG. 8 represents the two-dimensional image data that can be obtained from the surface of a core sample. Following processing in accordance with the method of the present disclosure, and rendering in the same way as the outcrop view of FIG. 7 the result is FIG. 9 in which the geological structure of the interior of the core sample is presented.

The synthesized core sample represented in FIG. 9 may be used in a variety of ways, for example in the calibration of logs and logging tools as is known in the art. The rock features in FIG. 9, being constituted by data processed in accordance with the present disclosure, extend throughout the core sample. It therefore is possible e.g. visually or otherwise to analyses geological features that otherwise would not be visible to the human observer by reason of lying inside the core sample. Since the synthesized image data extend through the core sample of FIG. 9 it is readily possible to display, measure and otherwise process features that would not be visible in a physical core sample by reason of forming part of the solid interior of the sample.

As noted the method of the present disclosure represents a significant advance compared with the prior art. The present disclosure additionally relates to log data produced by the method, images produced by the method, a logging tool as defined herein, a programmable device programmed to carry out the method and log image and log data produced using either a logging tool according to the present disclosure or a programmable device according to the present disclosure.

Preferences and options for a given aspect, feature or parameter of the present disclosure should, unless the context indicates otherwise, be regarded as having been disclosed in combination with any and all preferences and options for all other aspects, features, and parameters of the present disclosure.

The listing or discussion of an apparently prior-published document in this specification should not necessarily be taken as an acknowledgement that the document is part of the state of the art or is common general knowledge.

What is claimed is:

1. A method implemented with a logging system of improving imaging of rock penetrated by a borehole for recovering mineral material therefrom, the logging system including a logging tool and a programmable device, the method comprising the steps of:
   a. obtaining, at the programmable device of the logging system, a two-dimensional set of log values recorded with the logging tool of the logging system at a plurality of points i) about the periphery of the borehole, and ii) over a chosen length along the borehole;
   b. decomposing, with the programmable device, the set of log values by identifying in the set one or more main functions indicative of one or more main geological layer features of the rock penetrated by the borehole and removing a first of the log values corresponding to the one or more main functions from the set;
   c. further decomposing, with the programmable device, the set of log values by, as necessary iteratively, identifying in the set one or more subsidiary functions indicative of one or more 1st . . . nth subsidiary geological layer features of the borehole and removing a second of the log values corresponding to the 1st . . . nth subsidiary functions from the—for the time being—remaining set;
   d. designating, with the programmable device, a third of the log values of the set remaining after the identification and the removal of the second log values as texture;
   e. using the main and subsidiary functions indicative of the main and 1st-nth subsidiary layer features and the texture to construct, with the programmable device, a synthesized volume representing the rock removed during creation of the chosen length of the borehole; and
   f. determining, with the programmable device, geological features of the removed rock by analyzing the synthesized volume.

2. The method according to claim 1, wherein the set of log values includes one or more of resistivity image log values, acoustic image log values or density image log values.

3. The method according to claim 1, wherein the set of log values includes a plurality of azimuthal measurements of dielectric constant.

4. The method according to claim 1, including the steps of:
   g. identifying, in the set of log values, a plurality of slices, the slices being spaced vertically apart by spacings between the plurality of depths in the chosen length of the borehole or one or more multiples thereof, each of the slices being characterised by same angles $\phi$ and $\psi$; and
   h. designating the slices identified in Step g. as members of a same slice family, wherein the angle $\phi$ is between (i) the z-axis of an x, y, z co-ordinate system and (ii) a first vector that is normal to the members of the slice family, and wherein the angle $\psi$ is between (iii) a datum defined with respect to the circumference of the borehole and (iv) a projection of a second vector that is normal to a plane parallel to the base of a cylinder corresponding to the chosen length of the borehole.

5. The method according to claim 4, including the step of
i. allocating a slice number to each of the slices of the slice family.

6. The method according to claim 5, wherein the two-dimensional set of log values is $f_{ij}$, in which i=1, . . . , H enumerates rows and j=1, . . . , N enumerates columns, with each row corresponding to a depth measured along the length of the borehole and each column corresponding to an azimuthal angle from the datum defined with respect to the circumference of the borehole; wherein each slice is parametrised by the angle $\phi$ and by the angle $\psi$; wherein a directed length of projection of a vector $Of_{ij}$ from the center of the top of the cylinder is $p_{ij}$ and wherein the slice number is given by the expression $$v_{ij} = \text{round}\left(\frac{p_{ij}}{h}\right) = \text{round}\left(\frac{R}{h}\sin\phi\cos(\psi - \alpha_j) + (i-1)\cos\phi\right).$$

7. The method according to claim 6, wherein $m_{ij}$ is a mask having a value of 1 if a particular $f_{ij}$ is known and a value of 0 if a particular $f_{ij}$ is unknown, wherein decomposing the set of log values by identifying in the set the one or more main functions and removing the first log values comprises calculating $m_k = \Sigma_{v_{ij}=k} m_{ij}$; $f_k = \Sigma_{v_{ij}=k} f_{ij}$ and a mean $$\overline{f_k} = \frac{f_k}{m_k};$$

substituting $\overline{f_k}$ for $f_{ij}$ for all points in the set of log values for which $v_{ij}=k$; and subtracting $f_k$ from the set of log values in order to remove the geological log data signals corresponding to the one or more main function, such that at least one subsidiary function subsists in the resulting remaining geological log data signals set.

8. The method according to claim 7, including the steps of iteratively calculating $\overline{f_k}$ in respect of the geological log data signals corresponding to the 1st . . . nth subsidiary functions and in each iteration subtracting $\overline{f_k}$ from the set of log values.

9. The method according to claim 7, wherein the Step e. of using the main and subsidiary functions indicative of the main and 1st . . . nth subsidiary layer features and the texture to construct the synthesised volume representing the rock removed during creation of the chosen length of the borehole includes summing the first, second, and third log values corresponding to the main and 1st . . . nth subsidiary functions and the texture in accordance with the expression $$\overline{f_{ij}} = \sum_{l=1}^{L} \overline{f_{v_{ij}^l}}.$$

in which L additionally signifies the number of layer features identified.

10. The method according to claim 4, wherein each of the one more main functions is represented in the set of image log values by the angles $\phi$ and $\psi$, and wherein the Step b. includes identifying, in the set, the one or more main functions indicative of the one or more main geological layer features of the borehole by the step of j. determining the maximal variance of the angles $\phi$ and $\psi$.

11. The method according to claim 10, wherein the Step j. of determining the maximal variance of the angles $\phi$ and $\psi$ includes the Step k. of, in respect of said slice family, identifying the slice corresponding to the main geological layer feature and for which the variance of the values of the angles $\phi$ and $\psi$ of the set of resistivity log values of the slice family excluding the values of the angles $\phi$ and $\psi$ of the slice corresponding to the main geological layer feature is minimal.

12. The method according to claim 11, wherein the Step k. includes searching for a maximal value of the expression $$\text{fit}(\phi, \psi) = \sum_{v(\phi,\psi)} m_{v(\phi,\psi)} \overline{f_{v(\phi,\psi)}}^2.$$

as an indicator of the slice corresponding to the main geological layer feature; wherein $m_{v(\phi,\psi)}$ is the number of points in the slice with number $v(\phi,\psi)$ in the slice family defined by the angles $\phi$ and $\psi$; and wherein $f_{v(\phi,\psi)}$ is the mean value of the field f inside the slice with the number $v(\phi,\psi)$ in the slice family defined by the angles $\phi$ and $\psi$.

13. The method according to claim 4, wherein the Step c. of further decomposing the set of log values includes:
representing in the—for the time being—remaining set of log values each 1st . . . nth subsidiary geological layer feature by subsidiary angle data of the angles $\phi$ and $\psi$; and
identifying, in the set, the one or more subsidiary functions by the step of l. determining the maximal variance of the subsidiary angle data of the angles $\phi$ and $\psi$.

14. The method according to claim 13, including identifying a plurality of slices spaced vertically apart by spacings between the plurality of depths in the chosen length of the borehole or one or more multiples thereof, each of the slices being characterised by the same angles $\phi$ and $\psi$ and designating the slice families as relating to the one or more subsidiary layer features.

15. The method according to claim 13, wherein the Step l. of determining the maximal variance of the subsidiary angle data of the angles $\phi$ and $\psi$ includes the Step m. of identifying said subsidiary function for which the variance of the values of the subsidiary angles $\phi$ and $\psi$ of the geological log data signals set—for the time being—remaining are minimal.

16. The method according to claim 4, wherein the Step d. of designating the third log values as the texture includes the sub-steps of:
d1. in the field of remaining log values $r_{ij}$, calculating correlation radii $r_h$ and $r_z$;
d2. calculating layer parameters $\phi_t$ and $\psi_t$ for the field $r_{ij}^2$;
d3. calculating the variance $\sigma(z)$ for each slice;
d4. generating a 3D random field T'(x, y, z) such that $$T'(x, y, z) = \begin{cases} 0 & \text{if } x^2 + y^2 \geq 1 \\ rnd\left(0, \sigma(z')\sqrt{r_h^2 r_z}\right) & \text{if } x^2 + y^2 < 1 \end{cases},$$

where rnd is the randomly generated normally distributed value, z' is defined as number of slice which contains the point (x, y, z); and
d5. smoothing the field T'(x, y, z) by using the expression $$T(x, y, z) = \frac{1}{r_h^2 r_z} \sum_{x'=-r_h}^{r_h} \sum_{y'=-r_h}^{r_h} \sum_{z'=-r_z}^{r_z} T'(x+x', y+y', z+z')$$

wherein $r_h$ is the horizontal correlation radius of residual texture, and wherein $r_z$ is the vertical correlation radius of residual texture.

17. The method according to claim 1, wherein the Step e. of using the main and subsidiary functions indicative of the main and 1st . . . nth subsidiary layer features and the texture to construct the synthesised volume representing the rock removed during creation of the chosen length of the borehole includes summing the main function, the 1st . . . nth subsidiary function and the texture in respect of the volume representing the rock removed during creation of the chosen length of the borehole.

18. The method according to claim 1, including the step of modulating the synthesised volume with a variable measure of a geological property of the rock from place to place in the synthesised volume; and analysing the resulting modulated, synthesised volume.

19. The method according to claim 18, wherein the geological property is grain size or a proxy for grain size, selected from the list including resistivity, porosity, hardness, density, borehole diameter, or statistical measures relating to the distribution of values from one or more such properties in an interval, or any combination thereof.

* * * * *